United States Patent [19]

Chun et al.

[11] 3,907,666

[45] Sept. 23, 1975

[54] HYDROCARBON SWEETENING WITH A CALCINED PELLET OF COPPER SALT AND FERRIC OXIDE

[75] Inventors: Sun W. Chun, Murrysville; Harry A. Hamilton, Natrona Heights; Angelo A. Montagna, Monroeville, all of Pa.

[73] Assignee: Gulf Research & Development Company, Pittsburgh, Pa.

[22] Filed: Feb. 7, 1974

[21] Appl. No.: 440,603

Related U.S. Application Data

[63] Continuation of Ser. No. 163,068, July 15, 1971, Pat. No. 3,809,643.

[52] U.S. Cl. ............................. 208/191; 252/474
[51] Int. Cl. ..................... C10g 27/04; C10g 27/08
[58] Field of Search ........... 208/191, 195, 192, 193; 252/474

[56] References Cited

UNITED STATES PATENTS

| 2,080,365 | 5/1937 | von Fuchs et al. | 208/191 |
| 3,809,643 | 5/1974 | Chun et al. | 208/191 |

*Primary Examiner*—Delbert E. Gantz
*Assistant Examiner*—G. J. Crasanakis

[57] ABSTRACT

An oxidative sweetening process using a catalyst comprising a copper salt and a Group VIII iron group metal salt, preferably iron. The catalyst can be either supported or unsupported. The unsupported catalyst can be prepared by physically admixing and pelletizing copper chloride and ferric oxide or impregnating gelatinous iron oxide with a solution of copper chloride.

4 Claims, No Drawings

HYDROCARBON SWEETENING WITH A CALCINED PELLET OF COPPER SALT AND FERRIC OXIDE

This is a continuation of application Ser. No. 163,068 filed July 15, 1971 of Sun W. Chun, Harry A. Hamilton and Angelo A. Montagna, now U.S. Pat. No. 3,809,643 issued May 7, 1974, entitled "Oxidative Sweetening of Hydrocarbons with a Calcined Catalyst Containing Copper, Iron and Oxygen".

This invention relates to the use of a catalyst comprising an intimate admixture of copper and iron salts for the sweetening of petroleum hydrocarbons and to methods of preparing particularly active forms of the catalyst compositions.

BACKGROUND OF THE INVENTION

Thiols (mercaptans) are sulfur analogues of alcohols and contain an —SH (sulfhydril) group. Many petroleum fractions contain alkanethiols as minor constituents and these thiols impart to such fractions and their distillates an objectionable odor and corrosiveness. Distillates containing such objectionable sulfur derivatives are known as "sour" distillates, and processes for oxidizing the thiols or sulfhydril containing compounds to less objectionable disulfides are known as sweetening processes. The sweetening process is believed to be an oxidative coupling of two mercaptan molecules to give a disulfide, and thus the processes are normally run in the presence of a gas containing free molecular oxygen.

One of the most widely used catalysts for sweetening of sour petroleum fractions is copper chloride either in solution or on various supports. The use of sodium plumbite and caustic are also known. More recently, a patent to Norman L. Carr et al., U.S. Pat. No. 3,491,020, suggests the use of a catalyst composite comprising iron, silica and oxygen for the selective oxidation of mercaptans to disulfides. All of the above processes suffer, however, from low throughput life before the catalyst is required to be regenerated.

A catalyst composition has now been discovered which has unusually good activity and long cycle life for the conversion of compounds containing a sulfhydril group to a disulfide. This new catalyst composition comprises a copper and a Group VIII iron group metal which may be present in the form of an intimate admixture of the salts of these metals or may be present at least in part as a spinel having the formula:
$CuMe_2O_4$
where Cu is copper and Me is the Group VIII iron group metal.

The new catalyst composition can be unsupported or combined with a support material such as silica or alumina. Unsupported copper-iron catalysts may be prepared in any suitable manner such as by either impregnating a dry $Fe_2O_3$ gel with a solution of a suitable copper salt, such as copper chloride, or dispersing a solution of a suitable copper salt, such as copper chloride, in a wet ferric hydroxide gel. The preferred method of preparing the unsupported catalysts is to simply thoroughly blend copper chloride and ferric oxide and pelletize under elevated pressure. By "pelletizing" is meant transformation of a finely divided solid into particles of larger size which are suitable for use as a catalyst in a fixed bed type reactor. Pelletizing may occur in a very simple manner by subjecting the finely divided salts to increased pressure while being held in a mold, or the blended salts after mulling may be extruded through a die. A lubricant may be used but is not required. Suitable molding pressures or extruding are those commonly used in the catalyst formation art. Calcination in air of this physically blended catalyst can suitably occur at temperatures of 400°F. to 800°F. A Mossbauer spectra was run on some of these copper-iron catalysts, both supported and unsupported, and the presence of the spinel $CuFe_2O_4$ was detected.

The basic discovery here is that an oxidative sweetening reaction is promoted with a new catalyst comprising an intimate mixture of a copper salt and an iron group metal salt, preferably iron. Usually the copper and iron group metals are present as an intimate admixture of one or more salts of each of the metals. For example, the copper may be present at least in part as $CuCl_2$ intimately admixed with an iron compound or as part of a compound with an iron group metal such as the spinel $CuFe_2O_4$. The Group VIII iron group metal, known more simply as an iron group metal, oxidizes easily and is usually present as an oxide, for example, $Fe_2O_3$, or as part of a compound with Cu as above. By an "iron group metal" is meant iron, cobalt and nickel. The preferred iron group metal is iron. By an "intimate admixture" is meant an admixture prepared by chemical means, such as by coprecipitation or deposition from separate or combined solutions onto a support or an admixture prepared by the physical blending of finely divided (powdered) copper and iron group metal salts. It is believed that at least a portion of the copper and iron group metal forms a common salt such as $CuMe_2O_4$, where Me is an iron group metal.

Several unsupported copper-iron catalysts have been made by impregnating dry $Fe_2O_3$ with an aqueous copper chloride solution or precipitating an iron hydroxide gel from an aqueous solution of $FeCl_3$ using $NH_3$, blending with aqueous $CuCl_3$ until homogeneous, followed by drying and calcining. The preferred method of preparing the unsupported catalyst is to simply thoroughly blend finely divided copper chloride and finely divided ferric oxide; pelletize under elevated pressure; and calcine. Blending is preferably done in a ball mill.

Any suitable method can be used to prepare the supported copper-iron group catalysts so long as an intimate admixture of the copper and iron group metal salts is obtained on the support. For example, sequential impregnation of copper and iron salts onto a support such as silica gel or alumina can be employed as described more fully below.

While it is not positive, it is believed the copper and iron group metals are present either in the unsupported or supported form as the metal salts and not as the free metal. By a "metal salt" is meant the metal is always present in an ionic form and not in the zero valent state. Usually the copper is present as copper chloride, copper oxide, and at least a portion as $CuMe_2O_4$ where Me is an iron group metal. The copper may also be present in any other salt form, such as $CuBr_3$, $Cu(NO_3)_2$, or $Cu(C_2H_3O_2)_2$. The iron group metal is usually present in an oxide form such as $Fe_2O_3$ and at least a portion as $CuMe_2O_4$ since the iron group metal is easily oxidized. The iron group metal may also be present in its lower or higher oxidation states or in a hydrated form. Since all of the catalysts are dried and calcined in air before use and further since the sweetening reaction is usually operated in the presence of a gas containing free molecular oxygen, such as air, the iron group metal tends to be in some oxide state even though initally it may in the chloride, nitrate, acetate, hydroxide, etc. forms. while it is not certain, it is believed the catalysts of this invention are unique in their activity characteristics because at least a portion of the intimate admixture of the copper and iron salts becomes chemically combined to form $CuMe_2O_4$ where Me is an iron group metal. The deposition of the copper and iron group metal salts onto a support as silica gel or alumina renders the analytical job of determining the exact nature of the manner of combination of the copper and iron salts more difficult, but the presence of the spinel $CuFe_2O_4$ has been detected by the Mossbauer spectra using the silica base catalysts.

The molar ratio of copper to iron in the catalysts of this invention is important to obtain optimum activity. The molar ratio of copper to iron can suitably vary from 0.01:1 to 1.5:1 and is preferably from 0.1:1 to 1:1.

In the case of the unsupported catalyst, the amount of the copper salt can vary from 1 to 50 percent by weight of the total catalyst and is preferably from 5 to 35 percent by weight of the total catalyst. The iron group metal salt content of the unsupported catalyst can suitably be from 50 to 99 percent by weight of the total catalyst, and is preferably 65 percent by weight to 95 percent by weight of the total catalyst.

In the case of the supported catalyst, the amount of the copper salt is 0.1 to 50 percent by weight of the catalyst, usually 0.5 to 35 percent by weight of the final catalyst. The amount of the iron group metal salt can be from 5 to 50 percent by weight, preferably 5 to 35 percent by weight, of the total catalyst.

As will be indicated further below, the activity and stability of the copper-iron catalysts, at least for the sweetening reaction, is apparently greatly dependent on the method of preparing the catalyst and even, indeed, on the type of support and the sequential method of adding the copper and iron salts. Thus, while it is not certain as to just what it is which is conferring the catalytic properties, it is known that all of the intimate admixtures of copper and iron salts, either supported or unsupported, have surprising catalytic activity and stability albeit some have more activity and stability than others, depending on the particular method of preparation.

The copper-iron catalysts of this invention can be prepared by any suitable procedure. For example, a ferric hydroxide gel can be prepared in the normal manner, dried and impregnated with a solution of a copper salt such as copper chloride. This particular catalyst has been found to have excellent activity and good stability for the conversion of thiols to disulfides in an oxidative sweetening reaction. The stability of the catalyst is increased unexpectedly almost sixfold by simply dispersing the aqueous solution of copper chloride in the wet and still gelatinous ferric hydroxide gel followed by drying and calcining.

Catalysts have also been prepared by the sequential addition of copper and iron salts to supports such as silica gel and alumina. Catalysts containing four to 16 percent anhydrous copper chloride on silica gel resulted in relatively low throughputs of sweet hydrocarbon before regeneration was required. The addition of four percent copper chloride by the method of incipient wetness to an inorganic amorphous polymer of iron, silicon and oxygen such as that described in U.S. Pat. No. 3,491,020 to Carr et al resulted in a tenfold increase in throughput of sweet product despite the fact that a more difficult-to-sweeten, heavier hydrocarbon charge stock was used. The sequential addition of copper and iron salts onto supports such as silica gel and alumina results in active catalysts with the addition of iron to a copper on alumina catalyst having unusually good activity for the sweetening reaction.

PREPARATION OF UNSUPPORTED CATALYSTS

One preferred class of catalysts is the unsupported copper-iron group metal catalysts. These can be prepared by impregnating an iron group metal oxide or hydroxide either freshly prepared and wet or in a dried and calcined state with a solution of a copper salt. The iron group metal oxide or hydroxide can be prepared by any suitable procedure including precipitation from solutions containing the respective ions, recovery from ores or concentrates and any industrial by-product rich in iron group oxides. Usually an aqueous solution of a copper salt is employed, although alcoholic or other high dielectric constant materials, as dioxane, can be employed if desired to form the copper salt solutions. The only criteria is that the copper salt be soluble in the solvent in the concentration range desired. Preferably the copper salt is dispersed by suitable mixing means in the ferric oxide gel while the gel is still wet. The final catalyst is, of course, dried and calcined in air.

The most preferred method of preparing the unsupported catalysts is to simply thoroughly physically admix a finely divided copper salt, preferably copper chloride, with a finely divided iron salt, preferably iron oxide, followed by pelletizing the admixture at elevated pressures.

PREPARATION OF SUPPORTED CATALYSTS

As noted above, the copper and iron salts can be intimately admixed with any suitable support. Typical of such supports are silica gel; alumina; silica-magnesia; magnesia; and the silica-aluminas. The iron group metal is usually added to the support by impregnation from a solution of a suitable iron group metal salt. Usually an aqueous solution of an iron although, metal salt such as ferric chloride is employed, althrough, as with the copper salts, alcoholic or other high dielectric constant solutions or iron salts may be employed. Typical iron salts which can be utilized include ferric chloride, ferric nitrate, ferric sulfate, ferric acetate and ferrous nitrate. Similarly, the copper salts are usually deposited or combined with the support by impregnation using an aqueous alcoholic or other high dielectric constant solution of a copper salt. Typical copper salts include copper chloride, copper nitrate, copper acetate, copper sulfate and the copper halides. It has been found that, for the supported catalysts, if the iron is deposited first on the support followed by the addition of copper, silica gel is the preferred support material; while if copper is deposited first on the support, alumina is, for some unknown reason, unusually active as the support. The molar ratio of copper to iron is within the ranges defined above.

The wet composites containing the copper and iron salts are usually dried at temperatures between 200°F. and 300°F. for 16 hours. The catalysts are then usually calcined in the presence of air at temperatures from 400°F. to 800°F. for 16 hours. This calcination operation tends to convert any iron salt to an oxide form while some of the copper salts tend to remain in the form in which they were deposited, some is converted to the oxide, and perhaps it is during this operation that at least a portion of the copper chemically combines with the iron to form $CuFe_2O_4$.

The above described catalyst compositions are useful for the oxidative sweetening of petroleum hydrocarbons by the conversion of thiols to disulfides. The oxidative sweetening occurs by simply contacting the sour hydrocarbon charge stock with a catalyst comprising an intimate admixture of a copper salt and an iron group metal salt in the presence of a gas containing free molecular oxygen.

The charge stock can be any atmospheric petroleum distillate having a boiling point from about 50°F. to 700°F. This encompasses petroleum fractions all the way from liquid petroleum gas to heavy distillate fuel oils. Usually sweetening processes are relegated to the lighter boiling charge stocks such as liquid petroleum gas, gasolines and naphthas. It is one of the advantages of the catalysts of this invention that they are useful for the sweetening of higher boiling petroleum distillates such as kerosene and heavy distillate fuel oils.

In yet another embodiment of this invention it has been found that the catalysts of this invention are unusually stable to the presence of $H_2S$ in the feed stock. Normally hydrogen sulfide is removed from the charge stock before the sweetening operation to render the life of the sweetening catalyst reasonably attractive commercially. The catalysts of this invention are so stable that sweetening can occur without prior removal of $H_2S$. It has been found that the presence of 0.06 percent $H_2S$ in a gasoline boiling range charge stock was successfully sweetened employing the catalytic composites of this invention.

The sweetening process can be run either upflow or downflow but is usually run downflow by passing the charge stock containing usually from 5 to 1000 ppm alkanethiols downflow through a bed of the desired catalyst. A gas containing molecular oxygen, such as air, is normally passed concurrent to the charge stock in an amount at least stoichiometrically sufficient to react with the thiol content of the charge stock. Care must be taken not to use an excessive amount of oxygen as this tends to promote gum formation, resulting in catalyst deactivation and shorter life. A suitable amount of air is such that the stoichiometric ratio of oxygen to sulfhydril sulfur is from 0.5:1 to 20:1. The amount of oxygen in the gas containing free molecular oxygen can suitably vary from one to 100 percent, with the preferred gas obviously being air.

The sweetening reaction can occur under relatively mild reaction conditions. The reaction temperature can suitably be from 0°F. to 300°F. and is preferably from 80°F. to 200°F. The higher reaction temperatures are utilized for the higher boiling charge stocks. The reaction pressure can be atmospheric to 500 psig. preferably 25 to 100 psig. It is preferred to maintain the reactants and products in the liquid phase to reduce the required size of the reaction vessels, but this is not essential. The space velocity is not critical and can be from 1 to 50 LVHSV (liquid volume hourly space velocity) and is preferably from one to 10.

The invention will be further described with reference to the following experimental work.

EXAMPLE 1

In the run for this example, 908 grams of ferric chloride ($FeCl_3.6H_2O$) were dissolved in 5 liters of distilled water, and a ferric hydroxide gel was precipitated by the addition of 3050 ml of an aqueous ammonia (about 7% $NH_3$ by weight) solution at ambient conditions. The iron hydroxide gel was separated by filtration and washed to constant conductivity with water containing 0.0003% $NH_3$. It was dried at 250°F. for 16 hours and was calcined at 600°F. for 16 hours. To 25.4 grams of this support was impregnated by incipient wetness 20 ml of an aqueous solution of copper chloride containing sufficient copper chloride to result in a final catalyst having 16% anhydrous copper chloride, based on the total weight of the calcined catalyst. It was oven dried at 250°F. for 16 hours and calcined at 600°F. for 16 hours.

EXAMPLE 2

The catalyst of Example 1 was used to determine its activity and stability for the sweetening of a heavy distillate petroleum fraction whose properties are shown in Table I below.

TABLE I

HEAVY DISTILLATE FUEL OIL INSPECTIONS

| Inspection | Heavy Distillate Fuel Oil |
|---|---|
| Gravity: °API | 40.4 |
| Viscosity, SUV, 100°F. | 37.3 |
| Flash, P-M: °F. | 194 |
| Pour Point, °F. | +15 |
| Color, ASTM D1500 | 0.5 |
| Total Sulfur, Weight % | 0.12 |
| Mercaptan Sulfur: PPM | 394 |
| Total Acid Number, ASTM D-974 | 0.01 |
| Aniline Point, °F. | 175 |
| Distillation, ASTM D-86 | |
| Overpoint: °F. | 428 |
| Endpoint: °F. | 626 |
| 10% at: °F. | 500 |
| 50% at: °F. | 550 |
| 90% at: °F. | 592 |

The heavy distillate together with 65 standard cubic feet of air per barrel of distillate was passed upflow through a bed of the catalyst described in Example 1 at 150°F., 50 psig and a nine liquid hourly space velocity. The product was analyzed by the method of ASTM Test D-484 to determine when the product was sour, i.e. contained a sufficient amount of unconverted thiols so as not to pass the ASTM test for a sweet product. The volume throughput of sweet heavy distillate was 168 volumes of heavy distillate per volume of catalyst. The results of this run are shown on Table II below.

EXAMPLE 3

Prepared 1229 grams of iron hydroxide filter cake as described in Example 1. This still gelatinous iron hydroxide gel was blended until homogeneous with 100 cc of an aqueous solution containing 28.88 grams of $CuCl_2.2H_2O$. The nominal anhydrous copper chloride concentration was 16% by weight of the finished catalyst. It was allowed to stand at ambient conditions for three hours. Then it was oven dried at 250°F. for 16 hours and calcined at 600°F. 16 hours.

EXAMPLE 4

Example 2 was repeated except using the catalyst of Example 3. The volume throughput of sweet heavy distillate was 1,152 volumes per volume of catalyst. The result of this run is also shown in Table II below.

The catalysts in Examples 1 and 3 above were analyzed by X-ray spectrophotometry, and the results indicated that the catalysts contained α-Fe$_2$O$_3$ and no copper chloride. Although X-ray goes not show CuFe$_2$O$_4$, it may be present in a poorly crystallized form and therefore not detected by X-ray diffraction. However, the catalyst of Example 3 was found to contain a substantial portion of CuFe$_2$O$_4$ by Mossbauer spectroscopy.

EXAMPLE 5

A catalyst was prepared by impregnating a commercially available silica gel with a sufficient amount of an aqueous solution of ferric chloride by the method of incipient wetness so that the final catalyst would contain 25 percent Fe$_2$O$_3$ after calcination. This catalyst was dried at 250°F. for 16 hours and calcined at 900°F. for 16 hours in air. To this dry catalyst was added a sufficient amount of an aqueous solution of copper chloride by the method of incipient wetness to deposit onto the catalyst 4.46 percent copper chloride. The catalyst was dried at 250°F. for 16 hours and calcined at 600°F. in air for 16 hours.

EXAMPLE 6

Example 2 was repeated except using the catalyst of Example 5. The volume throughput of sweet heavy distillate was 126. The results of this run are also shown in Table II below.

EXAMPLE 7

A catalyst was prepared in the same manner as for Example 5 above, except the reverse order of addition of copper and iron was employed, i.e. the copper (4% CuCl$_2$) was deposited first, followed by the addition of the iron (25% Fe$_2$O$_3$). The catalyst was oven dried at 250°F. for 16 hours and calcined at 600°F. for 16 hours, both after the CuCl$_2$ impregnation and the FeCl$_3$ impregnation.

EXAMPLE 8

Example 2 was repeated except the catalyst of Example 7 was employed. The volume throughput of sweet heavy distillate was 90. The results of this run are shown in Table II below.

EXAMPLE 9

A series of catalysts was prepared wherein either 4, 10 or 16 percent copper chloride was deposited on the same silica gel as used for the catalyst of Example 5 above. The catalysts were prepared by the method of incipient wetness, dried at 250°F. for 16 hours and calcined at 600°F. for 16 hours.

Each of the three catalysts prepared in accordance with the procedure of Example 9 was tested for the sweetening of heavy distillate similar to the procedure of Example 2, and in each case a volume throughput of sweet product of 18 was achieved. The results of these runs are shown in Examples 10–12 in Table II below.

EXAMPLE 13

A four percent copper chloride catalyst on an alumina base was prepared in a manner similar to that shown in Example 9 above. The alumina was a gamma-alumina with the following inspections: BET S.A = 217 m$^2$/g, pore volume of 0.54 cc/g. and an average pore radius of 61 A.

EXAMPLE 14

Example 2 was repeated except using the catalyst of Example 13 and the volume throughput of sweet heavy distillate was 144. The results of this run are shown in Table II below.

EXAMPLE 15

The catalyst for this Example was the same as that for Example 7 above except the alumina base shown in Example 13 above was used in place of silica gel.

EXAMPLE 16

Example 2 was repeated except using the catalyst of Example 15. The volume throughput of sweet heavy distillate was 288. The results of this run are shown in Table II below.

TABLE II

Feed: Heavy Distillate Fuel Oil
Conditions: 150°F.; 50 psig; 9 LVHSV; and about 65 SCF air/bbl.

| Example No. | Catalyst | Volume Throughput |
|---|---|---|
| 2 | 16% CuCl$_2$ on Fe$_2$O$_3$ | 168 |
| 4 | 16% CuCl$_2$ dispersed in Fe$_2$O$_3$ | 1152 |
| 6 | 4% CuCl$_2$ deposited on a 25% Fe$_2$O$_3$ on SiO$_2$ catalyst | 126 |
| 8 | 25% Fe$_2$O$_3$ deposited on a 4% CuCl$_2$ on SiO$_2$ catalyst | 90 |
| 10 | 4% CuCl$_2$ on SiO$_2$ | 18 |
| 11 | 10% CuCl$_2$ on SiO$_2$ | 18 |
| 12 | 16% CuCl$_2$ on SiO$_2$ | 18 |
| 14 | 4% CuCl$_2$ on Al$_2$O$_3$ | 144 |
| 16 | 25% Fe$_2$O$_3$ on 4% CuCl$_2$ on Al$_2$O$_3$ | 288 |
| 18 | 25% Fe$_2$O$_3$ on SiO$_2$ | 0 |
| 20 | 4% CuCl$_2$ and 25% Fe$_2$O$_3$ on Al$_2$O$_3$ | 954+ |
| 22 | 4% CuCl$_2$ and 24% Fe$_2$O$_3$ on SiO$_2$ | 144 |

EXAMPLE 17

The catalyst for this Example was prepared by adding a sufficient amount of ferric chloride to silica gel by incipient wetness to deposit 25% Fe$_2$O$_3$ on the final catalyst. The catalyst was dried at 250°F. for 16 hours and calcined in air at 900°F. for 16 hours.

EXAMPLE 18

The catalyst of Example 17 was tried for the sweetening of the heavy distillate fuel oil shown in Table I and the results are shown on Table II above as Example 18. No sweet product was obtained.

EXAMPLE 19

The catalyst for this Example was prepared by coimpregnating by incipient wetness on the alumina of Example 13 a sufficient amount of ferric chloride and copper chloride to deposit 25% Fe$_2$O$_3$ and 4% anhydrous CuCl$_2$ on the final catalyst. The catalyst was dried at 250°F. for 16 hours and calcined at 600°F. for 16 hours.

EXAMPLE 20

Example 2 was repeated except using the catalyst of Example 19. The volume throughput of sweet heavy distillate was more than 954. The results of this run are shown in Table II above.

EXAMPLE 21

The catalyst for this Example was prepared by coimpregnating by incipient wetness on silica gel a sufficient amount of ferric chloride and copper chloride to deposit 25% $Fe_2O_3$ and 4% anhydrous $CuCl_2$ on the final catalyst. The catalyst was oven dried at 250°F. for 16 hours and calcined at 600°F. for 16 hours.

EXAMPLE 22

Example 2 was repeated except with the catalyst of Example 21. The volume throughput of sweet distillate was 144. The results are shown in Table II above.

Referring to Table II above, it can be seen that the use of copper chloride on silica gel or alumina results in relatively low throughputs of sweet heavy distillate, whereas the copper-iron catalysts of this invention provide surprisingly high throughputs of sweet heavy distillate. The throughputs in Examples 4 and 18 were particularly surprising and apparently are due in some unknown manner to the method of preparing the particular copper-iron catalysts.

EXAMPLE 23

Example 2 was repeated except the catalyst was different and was prepared by blending 10 grams of $CuCl_2 \cdot 2H_2O$ with 10 grams of powdered $Fe_2O_3$ by hand with a mortar and pestle. The copper chloride is a green, needle-like structure, while the ferric oxide powder is red. During the blending operation, the green needle-like structure of the copper salt became indiscernable. A wafer was prepared from the blended salts by compressing the salts without a lubricant in a mold at a pressure of 7500 psig. The wafer was then broken into 20-40 mesh particle-size pieces. The volume throughput of the sweet product was in excess of 2,808. The product was analyzed up to a throughput of about 1,800, and the copper and iron contents were usually less than one part per million.

Since little to no iron or copper was found in the product, it is believed that the copper and the iron salts may have formed a third common salt, probably the spinel $CuFe_2O_4$.

Resort may be had to such variations and modifications as fall within the spirit of the invention and the scope of the appended claims.

We claim:

1. A process for the oxidative sweetening of a sour hydrocarbon which comprises:
   contacting said hydrocarbon under sweetening conditions in the presence of a gas containing free molecular oxygen;
   with a catalyst prepared by a method which comprises intimately physically admixing a finely divided copper salt with finely divided ferric oxide;
   compressing the salts at a pressure sufficient to form a pellet;
   and thereafter calcining the pellet at a temperature of 400°-800°F.

2. A process according to claim 1 wherein the copper salt is copper chloride.

3. A process according to claim 2 wherein the pressure is about 7500 psig.

4. A process according to claim 2 wherein the amount of the copper salt is from 1 to 50 weight percent of the catalyst.

* * * * *